(12) United States Patent
Fisher et al.

(10) Patent No.: US 12,142,157 B2
(45) Date of Patent: Nov. 12, 2024

(54) APPARATUS AND METHODS FOR FABRICATING AND USING A SIMULATED ANATOMICAL TISSUE STRUCTURE

(71) Applicant: CLEARSIDE BIOMEDICAL, INC., Alpharetta, GA (US)

(72) Inventors: Nathan E. Fisher, Atlanta, GA (US); Chen-rei Wan, Smyrna, GA (US); Rafael Victor Andino, Grayson, GA (US)

(73) Assignee: Clearside Biomedical, Inc., Alpharetta, GA (US)

( * ) Notice: Subject to any disclaimer, the term of this patent is extended or adjusted under 35 U.S.C. 154(b) by 728 days.

(21) Appl. No.: 17/328,658

(22) Filed: May 24, 2021

(65) Prior Publication Data

US 2021/0366311 A1 Nov. 25, 2021

Related U.S. Application Data

(60) Provisional application No. 63/029,146, filed on May 22, 2020.

(51) Int. Cl.
*G09B 23/28* (2006.01)

(52) U.S. Cl.
CPC .................. *G09B 23/285* (2013.01)

(58) Field of Classification Search
CPC .... G09B 23/285; G09B 23/30; G09B 23/303; G09B 23/32
USPC ....................................................... 434/271
See application file for complete search history.

(56) References Cited

U.S. PATENT DOCUMENTS

| | | | | |
|---|---|---|---|---|
| 1,042,815 A | * | 10/1912 | Myers | G09B 23/30 434/271 |
| 2,322,117 A | * | 6/1943 | Dimitry | A61F 2/141 623/6.64 |
| 4,136,466 A | * | 1/1979 | Wrue | G09B 23/34 434/271 |
| 4,601,673 A | * | 7/1986 | Nasca | A63H 3/38 446/389 |
| 4,680,015 A | * | 7/1987 | Rones | G09B 23/32 434/271 |
| 4,762,495 A | * | 8/1988 | Maloney | G09B 23/30 623/5.11 |
| 5,893,719 A | * | 4/1999 | Radow | G09B 23/28 434/271 |
| 6,589,057 B1 | * | 7/2003 | Keenan | G09B 23/30 434/271 |
| 6,887,083 B2 | * | 5/2005 | Umeyama | G09B 23/30 434/271 |
| 7,066,598 B2 | * | 6/2006 | Niven | G09B 23/30 351/203 |
| 8,128,412 B2 | * | 3/2012 | Carda | G09B 23/30 434/271 |
| 8,137,111 B2 | * | 3/2012 | Carda | G09B 23/30 434/271 |
| 8,684,743 B2 | * | 4/2014 | Van Dalen | G09B 23/30 434/271 |
| 8,821,166 B2 | * | 9/2014 | Akura | G09B 23/28 623/4.1 |

(Continued)

*Primary Examiner* — Joseph B Baldori
(74) *Attorney, Agent, or Firm* — COOLEY LLP

(57) ABSTRACT

Embodiments disclosed include fabrication and use of a three-dimensional, multi-compartmental anatomical model of a portion of an eye.

31 Claims, 9 Drawing Sheets

(56) References Cited

U.S. PATENT DOCUMENTS

| | | | | |
|---|---|---|---|---|
| 8,845,334 B1* | 9/2014 | Stoll | G09B 23/28 | |
| | | | 434/270 | |
| 8,944,878 B2* | 2/2015 | Martin | G09B 23/36 | |
| | | | 434/296 | |
| 9,384,681 B2* | 7/2016 | Van Dalen | G09B 23/34 | |
| 9,437,119 B1* | 9/2016 | Bernal | G09B 23/34 | |
| 9,704,418 B2* | 7/2017 | Chang | G09B 23/30 | |
| 10,360,815 B2* | 7/2019 | Bernal | A61F 9/00736 | |
| 10,360,819 B2* | 7/2019 | Huh | G09B 23/32 | |
| 10,636,325 B2* | 4/2020 | Bernal | G09B 23/30 | |
| 11,475,797 B2* | 10/2022 | Omata | G09B 23/30 | |
| 11,551,582 B2* | 1/2023 | Slabber | G09B 23/28 | |
| 2008/0090015 A1* | 4/2008 | Alfaro | A61F 2/141 | |
| | | | 434/271 | |
| 2015/0024364 A1* | 1/2015 | Lee | G09B 23/32 | |
| | | | 434/271 | |
| 2016/0063898 A1* | 3/2016 | Bernal | G09B 23/306 | |
| | | | 434/271 | |
| 2016/0098944 A1* | 4/2016 | Lin | G09B 23/32 | |
| | | | 434/271 | |
| 2017/0165050 A1* | 6/2017 | Fripp | B29D 11/02 | |
| 2019/0244543 A1* | 8/2019 | Turk | G09B 23/30 | |
| 2019/0362654 A1* | 11/2019 | Omata | G09B 23/285 | |
| 2020/0118466 A1* | 4/2020 | Bernal | G09B 23/32 | |
| 2022/0051591 A1* | 2/2022 | Kanayama | C08G 18/4854 | |
| 2022/0313490 A1* | 10/2022 | Schieber | G09B 23/30 | |
| 2023/0237932 A1* | 7/2023 | Slabber | G09B 23/30 | |
| | | | 434/271 | |

\* cited by examiner

APPARATUS AND METHODS FOR FABRICATING AND USING A SIMULATED ANATOMICAL TISSUE STRUCTURE

CROSS-REFERENCE TO RELATED APPLICATIONS

The present application claims priority under 35 U.S.C. § 119(e) to U.S. Provisional Patent Application Ser. No. 63/029,146, entitled "APPARATUS AND METHODS FOR FABRICATING AND USING A SIMULATED ANATOMICAL TISSUE STRUCTURE," filed May 22, 2020, the entirety of which is incorporated herein by reference.

BACKGROUND

The eye of mammals is made of several coats, or layers, enclosing various anatomical structures. Briefly, the outermost layer, known as the fibrous tunic, is composed of the cornea and sclera. The middle layer, known as the vascular tunic or uvea, consists of the choroid, ciliary body, pigmented epithelium and iris. The innermost is the retina, oxygenated by blood vessels of the choroid and the retinal vessels. The spaces of the eye are filled with the aqueous humor anteriorly, between the cornea and lens, and the vitreous body, a jelly-like substance, behind the lens, filling the entire posterior cavity. The aqueous humor is a clear watery fluid that is contained in two areas: the anterior chamber between the cornea and the iris, and the posterior chamber between the iris and the lens. The lens is suspended to the ciliary body. The vitreous body is a clear substance composed of water and proteins, which give it a jelly-like and sticky composition. On the outer surface, six extraocular rectus muscles are coupled to the globe of the eye and control eye movements.

Currently, ophthalmic research and surgical education relies heavily on practice and testing on explanted animal eyes, including porcine, primate, rodent (e.g., rabbit) and human cadaver eyes. Explanted eyes come usually in a vial with remnants of ocular muscles and the optic nerve. Explanted eyes are covered in a mucous membrane called the conjunctiva which makes them slippery, and given their spherical shape, the explanted eyes can be difficult to handle, fix or stabilize to perform and practice a surgical procedure. There are limited available options for students of surgery or other medical procedures of the eye. For example, explanted eyes are not fixed and thus are relatively free to move, making incisions and other puncturing procedures difficult. Furthermore, currently available model eyes do not effectively simulate the variable physical properties (e.g., texture, thickness, tensile strength, etc.) of the various layers of tissue that are found in functional and dysfunctional eyes of different patients (e.g., of different ages, races, ethnicities, disease conditions, etc.). Said another way, a single explanted eye has particular properties specific to the mammal from which it was implanted, and thus provides a limited opportunity for training personnel to experience a broader range of properties expected to be found across a patient population. This training environment adds complications to the training exercise that are not present at the time of surgery and limits students' access to a close anatomical simulation of the surgical procedure across different patients. Also, because the eyes are explanted, the facial features and other anatomical structures around the eye are absent which sometimes detracts from the realism of the training procedure. In addition, explanted eyes usually have an intraocular pressure ("IOP") lower than what is physiologically normal in-vivo. Relatively low IOPs may correspond with flaccidity and lack of form, thereby limiting the realistic nature of the procedure during practice and training. To address this, explanted eyes are often injected with a solution (e.g., saline), or compressed manually to promote rigidity of the eye.

In some instances, synthetic eye models are currently used to simulate the biological eye. Currently available eye models, however, do not sufficiently meet the requirements of a simulated eye model. For example, there remains a needs for an eye model that sufficiently mimics the variability of anatomical features in a population of subjects, and the feedback provided by a biological eye during clinical procedures such as ocular injections. Moreover, there remains a need for a simple, cost-efficient, easily manipulated, simulated eye-model that provides a means to independently modify multiple properties of the model eye to simulate population variation.

SUMMARY

This disclosure relates to the fabrication and use of a three-dimensional ("3D") multi-compartmental anatomical model of the eye.

Embodiments disclosed include a device including an inner layer having a base portion and a hemispherical shape. The device further includes an outer layer having a hemispherical shape and being disposed over the inner layer. The outer layer and the inner layer collectively define a gap between the inner layer and the outer layer. The gap is configured to receive a fluid injectate that is injected using an injector. The device includes a dome portion disposed at an apex of the outer layer. The device further includes a set of indentations defined on an exterior surface of the outer layer. The set of indentations are configured to prevent a collapse of the outer layer over the inner layer in response to receiving the injectate.

DETAILED DESCRIPTION

Figure 1:
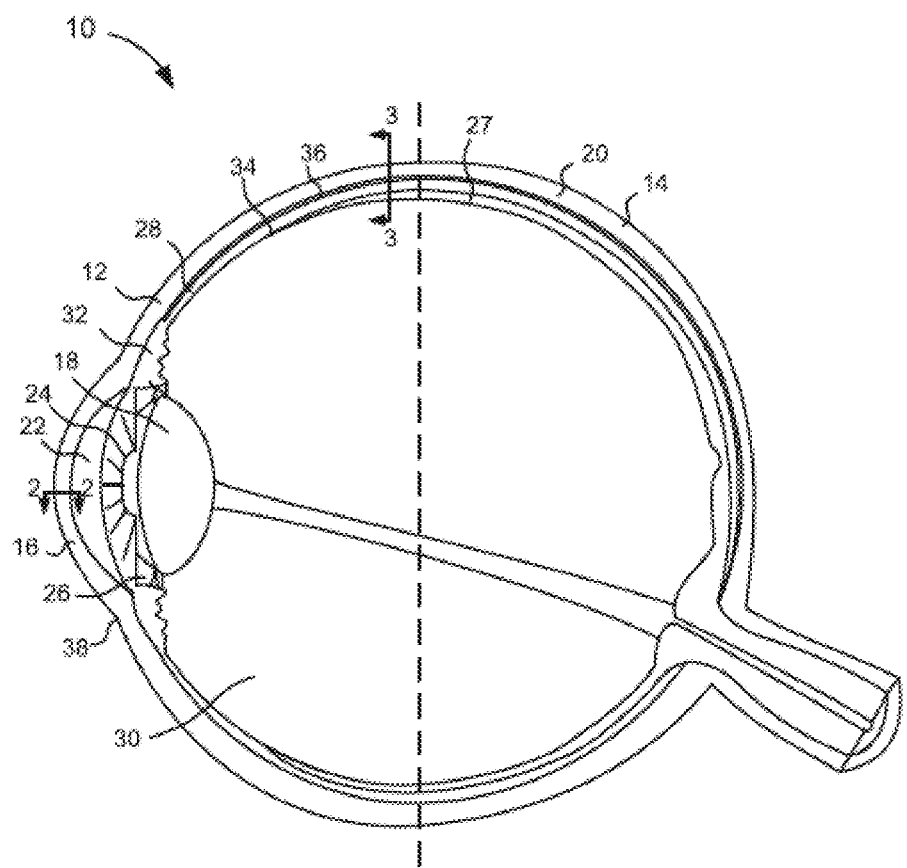
FIG. 1 is a cross-sectional view of an illustration of the human eye.

Systems and methods of the disclosure relate to fabricating and using a 3D multi-compartmental anatomical model of the eye.

The present disclosure relates to systems and methods to fabricate and use three-dimensional multi-compartmental models of an eye, also referred to herein as devices, which are designed to mimic a variable range of one or more mechanical properties of tissue structures and/or their pathologies. The various compartments of the devices can be configured to incorporate regions with varying mechanical and/or physical properties corresponding to tissue structures found across a target patient population. In some embodiments, the mechanical and/or physical properties of one or more compartments can vary across each compartment. In some embodiments, the mechanical and/or physical properties of one or more compartments can vary within a single compartment.

The disclosed multi-compartmental devices can be used for training personnel involved in surgical or other medical procedures conducted on the target patient population. In some embodiments, the multi-compartmental devices can be configured such that the different compartments are suitably situated to better elucidate differences between tissues of varying mechanical properties. For example, in some embodiments, adjacent and/or contiguous compartments or in one or more structures of a single device can be configured to simulate tissue structures corresponding to patients of different ages (e.g., having different thickness, stiffness, etc.). Using a multi-compartmental device that features simulated tissue of varying properties side-by-side, personnel undergoing training can practice handling the different types of tissue structures in a continuous manner without procedural interruptions and/or with a single model. The disclosed devices can be used for various purposes such as training devices, tools in a demonstration, teaching aids, instrument calibration aids, validation of medical procedures, and in the research and development of new medical tools and or procedures.

The embodiments and methods described herein can be used to train, educate personnel and/or demonstrate procedures of treatment, by delivering substances to and/or aspirating substances from, various target tissues and/or spaces defined or created therebetween in the eye. For reference, FIGS. 1-4 are various views of a human eye 10 (with FIGS. 2-4 being cross-sectional views). While specific regions are identified, those skilled in the art will recognize that the proceeding identified regions do not constitute the entirety of the eye 10, rather the identified regions are presented as a simplified example suitable for the discussion of the embodiments herein.

The eye 10 includes both an anterior segment 12 (the portion of the eye in front of and including the lens) and a posterior segment 14 (the portion of the eye behind the lens). The anterior segment 12 is bounded by the cornea 16 and the lens 18, while the posterior segment 14 is bounded by the sclera 20 and the lens 18. The anterior segment 12 is further subdivided into the anterior chamber 22, between the iris 24 and the cornea 16, and the posterior chamber 26, between the lens 18 and the iris 24. The cornea 16 and the sclera 20 collectively form a limbus 38 at the point at which they meet. The exposed portion of the sclera 20 on the anterior segment 12 of the eye is protected by a clear membrane referred to as the conjunctiva 45 (see e.g., FIGS. 2 and 3). Underlying the sclera 20 is the choroid 28 and the retina 27, collectively referred to as retinachoroidal tissue. A vitreous humour 30 (also referred to as the "vitreous") is disposed between a ciliary body 32 (including a ciliary muscle and a ciliary process) and the retina 27. The anterior portion of the retina 27 forms an *Ora serrata* 34. The loose connective tissue, or potential space, between the choroid 28 and the sclera 20 is referred to as the suprachoroid space. The area between the neural retina 27 and the retinal pigmented epithelium (RPE) is referred to as the sub-retinal space and represents a desired location for gene therapy directed to treatment of ocular ailments including retinal detachment, Usher's syndrome, etc.

Figure 2:
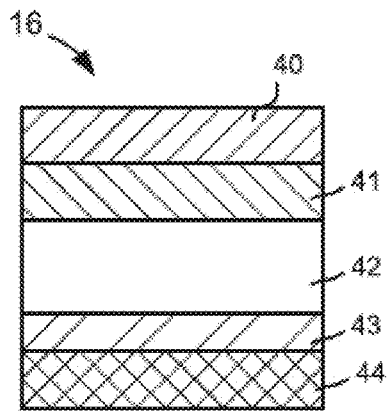
FIG. 2 is a cross-sectional view of a portion of the human eye of FIG. 1 taken along the line 2-2.

FIG. 2 illustrates the cornea 16, which is composed of the epithelium 40, the Bowman's layer 41, the stroma 42, the Descemet's membrane 43, and the endothelium 44.

Figure 3:
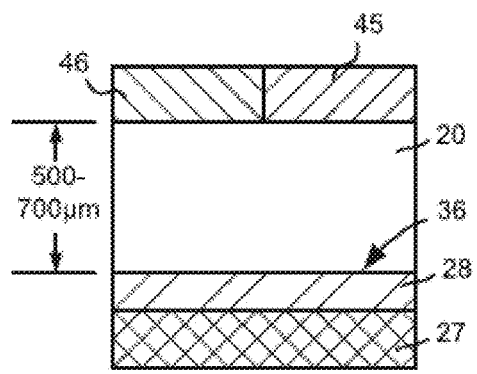
FIGS. 3 and 4 are cross-sectional views of a portion of the human eye of FIG. 1 taken along the line 3-3, illustrating the suprachoroidal space without and with, respectively, the presence of a fluid.

FIG. 3 illustrates the sclera 20 with surrounding Tenon's Capsule 46 or conjunctiva 45, suprachoroidal space 36, choroid 28, and retina 27, substantially without fluid and/or tissue separation in the suprachoroidal space 36 (i.e., the in this configuration, the space is "potential" suprachoroidal space). As shown in FIG. 3, the sclera 20 has a thickness between about 500 µm and 700 µm.

Figure 4:
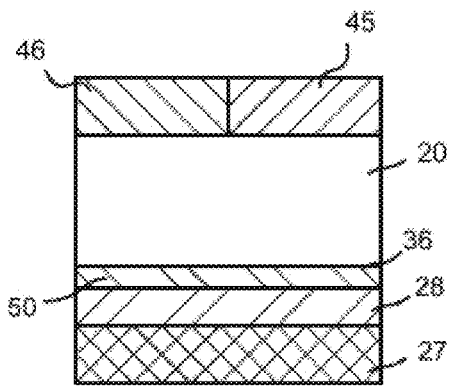

FIG. 4 illustrates the sclera 20 with the surrounding Tenon's Capsule 46 or the conjunctiva 45, suprachoroidal space 36, choroid 28, and retina 27, with fluid 50 in the suprachoroidal space 36. As used herein, the term "suprachoroidal space," or SCS which is synonymous with suprachoroid, or suprachoroidia, describes the space (or volume) and/or potential space (or potential volume) in the region of the eye 10 disposed between the sclera 20 and choroid 28.

This region primarily is composed of closely packed layers of long pigmented processes derived from each of the two adjacent tissues; however, a space can develop in this region because of fluid or other material buildup in the suprachoroidal space and the adjacent tissues. The suprachoroidal space can be expanded by fluid buildup because of some disease state in the eye or because of some trauma or surgical intervention.

In some embodiments, the fluid buildup is intentionally created by the delivery, injection and/or infusion of a drug formulation into the suprachoroid to create and/or expand further the suprachoroidal space 36 (i.e., by disposing a drug formulation therein). Not wishing to be bound by theory, it is believed that this volume or the SCS region may serve as a pathway for uveoscleral outflow (i.e., a natural process of the eye moving fluid from one region of the eye to the other through) and may become a space in instances of choroidal detachment from the sclera. The dashed line in FIG. 1 represents the equator of the eye 10.

In some embodiments, the insertion site of any of the microneedles and/or methods described herein is between the equator and the limbus 38 (i.e., in the anterior portion 12 of the eye 10). For example, in some embodiments, the insertion site is between about two millimeters and 10 millimeters (mm) posterior to the limbus 38. In other embodiments, the insertion site of the microneedle is at about the equator of the eye 10. In still other embodiments, the insertion site is posterior the equator of the eye 10. In this manner, a drug formulation can be introduced (e.g., via the microneedle) into the suprachoroidal space 36 at the site of the insertion and can flow through the suprachoroidal space 36 away from the site of insertion during an infusion event (e.g., during injection). The design and/or administration of treatment in the suprachoroidal space can involve extensive training and/or testing. Embodiments disclosed herein include three-dimensional multi-compartmental models of an eye that can be used for the training and/or testing.

Figure 5:
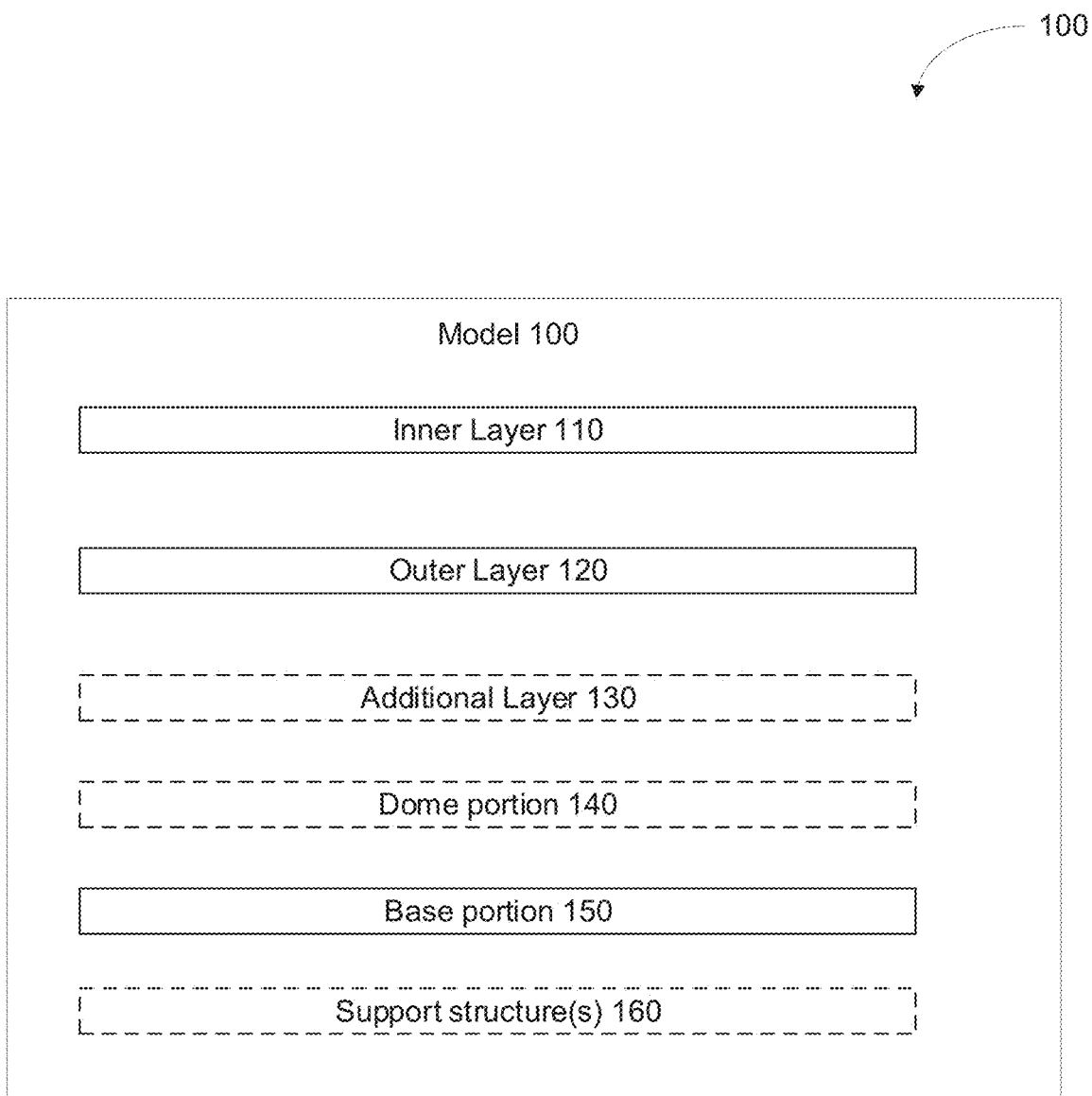
FIG. 5 is a schematic representation of a three-dimensional ("3D") multi-compartmental model of an eye, according to an embodiment.

FIG. 5 shows a schematic representation of a three-dimensional multi-compartmental model of an eye 100 (also referred to herein as "the model"). The model 100 includes an inner layer 110, an outer layer 120, and a base portion 150. In some embodiments, the model 100 optionally includes one or more support structures 160, the additional layer 130 and/or the dome portion 140 (as illustrated in broken lines in FIG. 5). In some embodiments, the model 100 can be configured to be a single-use device to be disposed after use. In some embodiments, the model 100 can be configured to be re-useable. For example, in some embodiments, the model 100 can be formed using materials (e.g., re-useable plastic, re-useable rubber, silicone, re-useable polymers, and/or the like) that can withstand the model 100 being washed (e.g., washed using detergents), cleaned, and/or treated in any suitable manner (e.g., autoclaved, sanitized, and/or the like) after each use or after a predetermined set of uses. In some embodiments, the model 100 can be fabricated to be assembled from portions wherein some portions of the model 100 are re-useable (e.g., the inner layer 110, the outer layer 120, the additional layer 130, etc.,) while some other portions can be configured to be for single-use (e.g., support structures 160 that form ridges, struts etc.,).

The inner layer 110 provides the resistance and rigidity of the model 100. In some embodiments, the inner layer 110 can be fabricated to mimic an intra-ocular pressure of a biological eye. For example, in some embodiments, the inner layer 110 can be fabricated to mimic a pressure of 5-40 mm Hg. In some embodiments, the inner layer 110 can be configured to mimic a choroid or a retina or a combined choroid and retina (uvea) of a biological eye.

The inner layer 110 can be made of an elastomeric material. In some embodiments, the inner layer 110 can be fabricated as an integral portion of the model 100. The inner layer 110 can be at least partially hemispherical in shape to simulate a portion of the globe of an eye (e.g., anterior portion of a human eye). In some embodiments, the inner layer 110 can be hemispherical in shape and concentric with the outer layer 120 which can also be shaped at least partially hemispherical to simulate a portion of the globe of an eye (e.g., anterior portion of a human eye). The inner layer 110 can have any suitable radius of curvature. For example, in some embodiments the inner layer 110 can have a radius of curvature of about 8-12 mm. The inner layer 110 can have a suitable thickness and/or stiffness configured to provide support for the model eye 100. For example, in some embodiments, the inner layer 110 can be solid. In some embodiments the inner layer 110 can be hollow with a suitable thickness sufficient to provide support for the model eye 100. As an example, the inner layer 110 can be made with a material with a hardness of about 20-75 on the Durometer Shore A Scale. As another example, the inner layer 110 can have a thickness between about 0.5 mm and about 8 mm. In some embodiments, the inner layer 110 can have different regions defined to have different thickness, hardness, orientation, shape and/or size.

The outer layer 120 of the model 100 provides the handling surface for a user to handle and use the model 100. In some implementations, the outer layer 120 can be made of one or more sub-layers, each sub-layer of the outer layer 120 being made of an elastomeric material. In some implementations, the outer layer 120 can be fabricated to mimic the sclera or any other suitable outer surface of a human eye, such as, for example, the conjunctiva. In some implementations, the outer layer 120 can mimic the sclera and the additional layer 130 can be used to mimic layers exterior to the sclera such as, for example, the conjunctiva. In some instances, the outer layer 120 can be made of a partially or fully transparent material such that when a colored substance is injected as can be visualized through the outer layer 120. The outer layer 120 can be hemispherical in shape to simulate a portion of the globe of an eye (e.g., anterior portion of a human eye). In some embodiments, the outer layer 120 can be hemispherical in shape and concentric with the inner layer 110 which can also be shaped hemispherical, as described herein. The radius of the outer layer can be between about 10-15 mm. The outer layer 120 can have a suitable hardness to mimic the sclera or any other suitable outer layer of a human eye. For example, the outer layer 120 can have hardness that is approximately 20-75 on the Durometer Shore A Scale. The outer layer 120 can have any suitable thickness. For example, the outer layer 120 can have a thickness suited to mimic the scleral thickness of a human eye (e.g., thickness between about 0.5 mm and 3 mm).

In some embodiments, various properties and/or portions of the outer layer 120 can be independently modified to include different regions defined to have different thickness, stiffness, orientation, shape, size, and/or the like. For example, in some embodiments, the model 100 can be designed to demarcate regions (e.g., quadrants) such that each region is configured to mimic structural, mechanical and/or other physical properties of an eye sampled from a specific target population (e.g., an age of a patient population, a specific pathophysiology, etc.). The model 100 can be formed such that each region can be independently modified to reach a suitable hardness. For example, in some embodiments, four quadrants of the outer layer 120 can be marked with increasing hardness and/or thickness to mimic increasing scleral thickness found in patient populations. The model 100 can thus be used to provide a clinically relevant impression of the variety of scleral thicknesses among patients. Model 100 with varying regions of the outer layer 120 can be used to practice medical procedures such as administering intraocular suprachoroidal injections. Embodiments with gradually varying regions of the outer layer 120 can be used to facilitate stepwise practice procedure with increasing levels of difficulty (e.g., increase in difficulty of administration of injection with increase in thickness of the outer layer 120 mimicking increase in scleral thickness).

In some embodiments, the outer layer 120 can be configured to mimic the outer surface of an eye such that, during a simulation of an intraocular injection procedure using an injector, the model 100 provides visual, tactile, and/or haptic feedback when a distal end and/or a needle hub, of the injector contacts the outer layer 120. For example, the outer layer 120 can provide a visual indication by assuming an indentation that appropriately mimics an indentation (e.g., produces similar depth and/or width of indentation) that would be observed in a biological eye during a similar, clinical procedure. The outer layer 120 can release the indentation and bounce back to mimic the response of an outer layer (e.g., sclera and/or conjunctiva) of an eye. The outer layer 120 can provide a haptic feedback similar to the feedback provided by a scleral layer of a biological eye in terms of resistance and/or backpressure provided by the outer layer 120.

In some embodiments, the outer layer 120 can include visual identifications and/or demarcations to mimic anatomical components of the eye. For example, the dome portion 140 described below can mimic the cornea and the portion of the outer layer 120 adjacent to the dome portion 140 can include markings indicating the outline of the cornea. In some embodiments, specified regions of the outer layer 120 can be marked and/or modified suitably to indicate regions that are intended for access and the regions that are not intended for access. For example, in some embodiments, a portion of the outer layer 120 (e.g., a portion mimicking the pars plana and adjacent to the region mimicking the cornea) can include a clear coating using a suitable material such that the coated region is not intended for practicing administration of an injection and is more resilient to puncturing.

The model 100 includes a base portion 150 fabricated to support the remaining portions of the model 100 such that the model 100 can simulate a portion of an eye. In some embodiments, the base portion 150 can be included in or formed as a portion of the inner layer 110. In some embodiments, the base portion 150 can be included in or formed as a portion of the outer layer 120. In some embodiments the base portion 150 can be made of a material with a stiffness configured to support and maintain a gap defined between the inner layer 110 and the outer layer 120.

As described previously, treatment of various conditions can involve targeting injections for delivery of medicaments and/or aspiration from specific layers and/or regions defined therebetween of the eye. The administration of injections into different target layers and/or regions of the eye can cause variability in the amount of the force required for insertion of the needle and/or injection of the medicament. Different layers and/or regions of the eye can have different densities. For example, the sclera generally has a higher density than the conjunctiva or the SCS. The amount of backpressure against an injector or a delivery member can be a function of the tissue characteristics of the target tissue (e.g., tissue density, presence of voids, tissue type, etc.). Differences in the density of the target region or layer can produce different backpressure against the needle exit, i.e., the tip of the needle from which the fluid emerges. Thus, injection into a relatively dense ocular material such as sclera requires more motive pressure to expel the medicament from the needle than is required when injecting a medicament into the SCS and/or the subretinal space ("SRS"). The SRS denotes the area between the neural retinal layer and the Retinal Pigmented Epithelial layer ("RPE"). The SRS represents a desired location for administering several therapeutic agents including agents for gene therapy. The model 100 can include adaptations to mimic the natural variations in densities of various layers of the biological eye. The model 100 can include modifications to mimic the natural differences in back pressures encountered when piercing through and/or during injection of fluid into and/or during aspiration of fluid from one or more layers or spaces of the eye. In some instances, the model 100 can provide for trainees to perceive as well as measure back pressure during a training procedure (e.g., by coupling an injector in fluidic communication with a needle that is being inserted into a target region or space of the model 100 to an in-line manometer).

In some embodiments, the outer layer 120 and the inner layer 110 can collectively define a gap (not shown in FIG. 5) between the outer layer 120 and the inner layer 110. The gap between the inner layer 110 and the outer layer 120 can be fabricated to mimic, for example, an SCS or SRS of a human eye. As described with reference to FIG. 1, the loose connective tissue, or potential space, between the choroid 28 and the sclera 20 is referred to as the suprachoroid. In some embodiments, the gap can be empty. In some embodiments, the gap can be filled with a substance of suitable density such that when an injection needle is inserted through the outer layer 120 and into the gap, a loss of resistance can be encountered. For example, a loss of resistance can be registered in the form of haptic feedback felt by the user.

In some embodiments, the model 100 can be used to simulate administration of an injectate in a target location of the human eye, specifically in the SCS. The injectate can include at least one of a fluid, gel, semisolid, or pellets or any other suitable form of drug formulation as desired. In some embodiments, the outer layer 120 can be a first region of the target location having a first density and the gap defined between the outer layer 120 and the inner layer 110 can be a second region of the target location having a second density, lower than the first density. In some embodiments, the first region of the target location produces a first backpressure and the second region of the target location produces a second backpressure, lower than the first backpressure.

In some instances, an injector can be used with an engagement member configured to provide variable resistance during an injection procedure. For example, a first level of resistance when the puncture member of the injector is in a first portion of the eye and a second level of resistance when the puncture member is in a second portion of the eye, the first level of resistance being different than the second level of resistance. In some embodiments, for example, the first portion of the eye can be the sclera and the second portion of the eye can be the suprachoroidal space. The outer layer 120 can be configured to mimic the variable resistance expected to be encountered during insertion of the injector in the biological eye.

In some embodiments, the model 100 can optionally include one or more support structures 160 configured to provide structural support to portions of the model 100. In some embodiments, one or more of the support structures 160 can be formed separately to be assembled and/or modified to form the model 100. In some embodiments, one or more of the support structures 160 can be made to be part of another component (e.g., part of the inner layer 110). In some embodiments, one or more of the support structures 160 can be formed separately to be assembled and/or modified to form the model 100. In some embodiments, the inner layer 110 and/or the outer layer 120 can be suitably modified to include one or more support structures 160 to further provide support and/or maintain the gap defined between the inner layer 110 and the outer layer 120. For example, in some embodiments, the inner layer 110 can include support structure 160 in the form of a bottom lip portion (not shown in FIG. 5) configured to support the inner layer 110 and to maintain the gap between the inner layer 110 and the outer layer 120. In some embodiments, the base portion 150, optionally formed as a portion of the inner layer 110 and can include a bottom lip portion along the outer circumference. The bottom lip portion can protrude circumferentially outward from the outer edge of the base portion 150 can be formed to be at least partially in contact with an inner surface of the outer layer 120 when the inner layer 110, base portion 150, and the outer layer 120 are assembled or formed together. The bottom lip can be of a desired stiffness such that it aids in maintaining a gap between the inner layer 110 and the outer layer 120.

The bottom lip portion can extend to connect the inner layer 110 with the base portion 150 as described herein. The bottom lip portion can have a radius that is approximately 0.2-3 mm larger than the radius of another portion of the inner layer 110, in order to maintain the gap between the inner layer 110 and outer layer 120.

In some instances, during use of the model 100, the outer layer 120 may be prone to collapsing over the inner layer 110 when an injectate is being injected into the gap between the inner layer 110 and outer layer 120, for example, due to surface tension imparted by the injectate. In some embodiments the exterior surface of the inner layer 110 can include support structures 160 in the form of a suitable number of small indented or pitted hemispheres (e.g., golf-ball like surface texture) with each indentation having a suitable size and shape. The indentations 160 can be configured to prevent collapsing of the outer layer 120 over the inner layer 110, for example, during use when an injectate is injected between the outer layer 120 and the inner layer 110. For example, the diameter of each indentation can be approximately 1-5 mm and the total number of indentations can be about 10-50. The indentations can be configured to maintain the gap between the inner layer 110 and the outer layer 120 without allowing the outer layer 120 to collapse or seal upon the inner layer 110. In some embodiments, the indentations or a portion of the indentations can be configured to provide visual guidance such that the spread of an injectate injected into the gap between the inner layer 110 and the outer layer 120 can be visualized (e.g., by the operator from outside the model) via the outer layer 120. In some embodiments, the exterior surface of the inner layer 110 can include support structures 160 in the form of one or more ridges (not shown in FIG. 5) configured to further support the inner layer 110 and the outer layer 120 and maintain the gap between the inner layer 110 and the outer layer 120. For example, some embodiments of the model 100 can include four ridges, equally-spaced from each other, each ridge being approximately 0.2-3 mm in thickness. The ridges can be made from any suitable material to provide desired support for the inner layer 110 and/or the outer layer 120. In some embodiments, any suitable number of ridges can be used, such as, for example, one ridge, two ridges, three ridges, or five or more ridges).

In some embodiments, the model 100 optionally includes an additional layer 130 as indicated by dashed lines in FIG. 5. The additional layer 130 can be made with suitable material (e.g., elastomeric material) with a suitable thickness and stiffness to mimic intermediate layers or portions of an eye. For example, in some embodiments, the additional layer 130 can be fabricated to be disposed over the outer layer 120 to mimic the conjunctiva of a biological eye. In some embodiments, the additional layer 130 can be approximately 0.1-1 mm with a hardness of approximately 5-10 on the Durometer Shore A scale.

In some embodiments, the model 100 optionally includes a protruded dome portion 140 on the center exterior of the outer layer 120. The dome portion 140 can be configured to mimic the anterior chamber of the eye. In some embodiments, the dome portion 140 can be disposed over the outer layer 120, for example, at an apex of the outer layer 120. In some embodiments, the dome portion 140 can be defined as a part of the outer layer 120, for example, by replacing a portion of the apex of the outer layer 120. In some embodiments, the dome portion 140 can be disposed over the additional layer 130, for example at an apex of the additional layer 130. In some embodiments, the dome portion 140 can be formed separately and configured to be attached to a part of the outer layer 120 or the additional layer 130. In some embodiments, the dome portion 140 can be defined as a part of the additional layer 130, for example, by replacing a portion of the apex of the additional layer 130. The dome portion 140 can have a different radius (e.g., a smaller radius) than the outer layer 120 and/or the additional layer 130. The differential radius between the outer layer 120 and the dome portion 140 can be used to delineate the limbus.

In some embodiments, one or more portions of the model 100 can be configured to be selectively and/or independently modified as desired to suitably mimic one or more features or anatomical properties of eyes (e.g., natural variations in a population, pathologies associated with illnesses, etc.) For example, the gap between the inner layer 110 and the outer layer 120 can be independently modified to suitably mimic the natural variation observed in the SCS and/or SRS of a population of subjects across demographics. Said in another way, in some embodiments, a single model 100 can be configured to mimic variations in SCSs and SRSs observed across a population. For example, the model 100 can include two or more regions (e.g., quadrants) that can be demarcated such that the gap defined by the outer layer 120 and the inner layer 110 in each region can mimic the SCS and/or SRS of a different patient population (e.g., variations based on demographics, pathophysiology, etc.).

As another example, in some embodiments, the model 100 can be marked by quadrants wherein the outer layer 120 associated with each quadrant is of a different thickness and/or stiffness. As an example, each quadrant can have a varying degree of thickness of the outer layer 120 to mimic varying scleral thickness associated with ageing, gender differentiation, ethnicity-based differentiation, and/or the like. Some such embodiments can be configured to be used to train personnel carrying out medical procedures such that intraocular injections (e.g., injections into the SCS and/or SRS). In some such embodiments, each quadrant can be indicated by suitable demarcations such that during training a student can easily and in quick succession identify differences between injection procedure associated with different scleral thicknesses, using the same model 100 under similar procedural conditions. In some implementations, an injector can be manually actuated by using loss of resistance technology as feedback for indications of progress in injection procedure. In such implementations, the variations of each quadrant can be suitably used to adopt an optimal strategy for actuation and/or injection. Training with a model 100 that includes multiple variations would be helpful for a user to be able to practice and experience various levels of resistance change in a quick succession.

The model 100 can be configured to be used as a stable free-standing model without any support fixtures. In some instances, one or more support fixtures can be formed and used as desired to hold a model 100 in a fixed position if and when required (e.g., during a training involving a single model and multiple trainees, etc.).

The model 100 can be fabricated and/or manufactured using any suitable procedure. For example, in some embodiments, the model 100 can be manufactured through high volume manufacturing techniques, such as injection molding. In some embodiments, one or more portions of the model 100 can be integrally and/or monolithically formed with some portions disposed in their desired position and/or configuration with respect to other portions during fabrication or manufacturing such that no modification is needed before use of the model 100. For example, inner layer 110 can be fabricated to be disposed within the outer layer 120 with the base portion 150 supporting the inner layer 110 and the outer layer 120, ready to use upon fabrication. In some embodiments, the model 100 can be integrally and/or monolithically formed, however, some portions may not be disposed in their desired position and/or configuration with respect to other portions during fabrication or manufacturing. In some such embodiments, the model 100 can be modified in a predetermined manner to dispose the portions of the model 100 in the desired manner before use. For example, in some instances, the model 100 can be fabricated such that the inner layer 110 and the outer layer 120 are contiguously formed (e.g., in the shape of a hyperboloid or an hour-glass) during fabrication. Following fabrication, the outer layer 120 can be configured to be inverted to be disposed over the inner layer 110 with the base portion 150 supporting the inner layer 110 and the outer layer 120, ready to use upon fabrication.

In some embodiments, one or more portions of the model 100 (e.g., the inner layer 110 and/or the outer layer 120) can be formed separately and configured to be detachably connectable such that the portions can be assembled and/or coupled together to form the model 100. In some embodiments, the outer layer 120 can be formed separately from the inner layer 110 and configured to then be coupled to the inner layer 110 to form the model 100. In some such embodiments, the inner layer 110 and/or the outer layer 120 can include one or more features to aid in alignment and/or coupling of the inner layer 110 with the outer layer 120. For example, in some embodiments, the interior surface of the outer layer 120 can include a keying feature placed at the center to align the outer layer 120 with the inner layer 110. The center of the exterior surface of the inner layer 110 of some such embodiments can include a similarly positioned keying feature. The keying feature on the exterior surface of the inner layer 110 and the keying feature on the interior surface of the outer layer 120 can be configured to matingly couple or match in any suitable manner such that upon fabrication the inner layer 110 can be aligned and/or centered relative to the outer layer 120, and the model 100 can be assembled.

In some embodiments, one or more portions of the model 100 (e.g., one or more of the support structures 160) can be formed of a relatively rigid material such as a plastic or the like and can be configured to retain its shape and/or form when exposed to changes in pressure and/or injection of fluid. Conversely, other portions (e.g., the inner layer 110 and the outer layer 120) of the model 100 (e.g., inner layer 110, additional layer 130, and/or outer layer 120) can be formed of a relatively pliable material (e.g., molded rubber, flexible plastic, etc.,) and can be configured to elastically deform in response to a compressive force. As such, the portions (e.g., the inner layer 110 and/or the outer layer 120) can be configured to change shape and/or form in response to an applied force, which in turn, results in a change in the volume of the gap between the inner layer 110 and the outer layer 120.

The model 100 can be used to provide standardized anatomical models for human eyes, that are clinically relevant with appropriate sizing and feel of biological (e.g., human) eyes. The model 100 can replace porcine eyes that are otherwise used for training personnel. The model 100 can also provide increased control across individual models and training experiences and remove any ambiguity or misinformation associated with the natural variability in porcine eyes. The model 100 can minimize any potential biohazard risk associated with porcine eyes. The model 100 can also provide increased availability of procedure training globally including regions that may not operate well for the use of porcine eyes. The model 100 can be used for training personnel in performing clinical procedures such as intraocular injections (e.g., injections into the suprachoroi-dal space). The model 100 can be fabricated to have a clear, transparent and/or translucent outer layer 120 such that when used to perform intraocular injections the model 100 can provide critical feedback to the trainee via the visualization of a needle being inserted into the model 100 and towards a target region and upon insertion and delivery of an injectate the visualization of a spread of the injectate. The model 100 can provide anatomical models with increased shelf life, reduced shipping and handling costs (e.g., without the need for cold chain shipping and storage). The model 100 can provide ability to be manufactured using high volume manufacturing techniques thereby reducing costs.

Figure 6A:
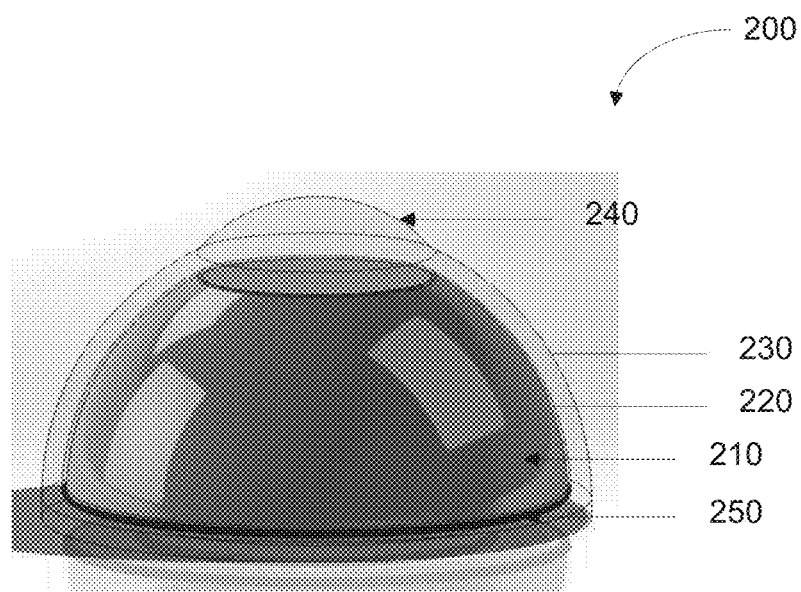
FIGS. 6A and 6B are illustrations in a perspective and cross-sectional side view, respectfully, of a 3D multi-compartmental model of an eye, according to an embodiment.
Figure 6B:
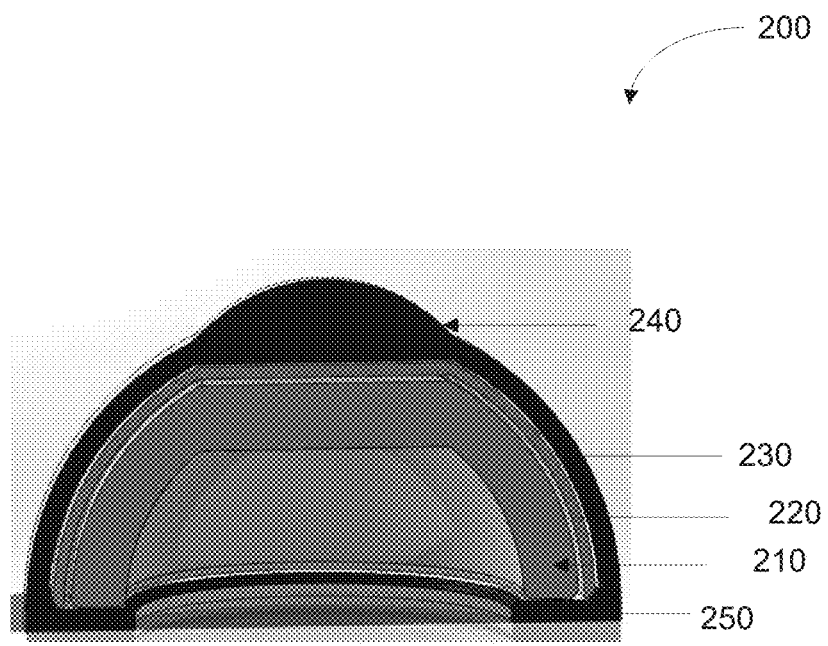

FIGS. 6A and 6B are illustrations of a perspective view and a cross-sectional side view, respectively, of a model 200, according to an embodiment. The model 200 can be the same as or similar to in structure and/or function to the model 100 described above. Thus, portions of the model 200 are not described in further detail herein. The model 200 includes an at least partially hemispherical inner layer 210, an at least partially hemi-spherical outer layer 220 disposed over the inner layer 210, and a base portion 250 disposed below the inner layer 210 and the outer layer 220. The model 200 also includes an additional layer 230 also at least partially hemispherical and disposed over the outer layer 220. A dome portion 240 is defined at the apex of the at least partially hemispherical additional layer 230. In some implementations, the model 200 can be configured to be fabricated in large batches with cost effective materials and/or cost-effective methods of fabrication with low assembly requirements such that it can be a single-use device to be disposed after use. For example, in some implementations, one or more components may be made through thermoforming or injecting molding with elastomers selected from materials including silicone, rubber or other types of visco-elastomers. In some implementations, one or more components may be made with plastic.

In some implementations, as described with reference to the model 100, the model 200 can be fabricated using relatively durable materials (e.g., re-useable plastic, re-useable rubber, silicone, re-useable polymers, and/or the like) that can withstand being washed (e.g., washed using detergents), cleaned, and/or treated in any suitable manner (e.g., autoclaved, sanitized, and/or the like) after each use or after a pre-determined set of uses. In some implementations, the model 200, similar to the model 100 described above, can be fabricated in parts and be assembled together to form the functional model 200. In some instances, the model 200 can be disassembled after use to be suitably washed or treated before re-assembly for use. In some implementations, the material selection to fabricate one or more components can be directed to a stretchable property of the components. For example, the outer layer 120, inner layer, and/or the additional layer 130 can be formed using a stretchable material such that the model 100 can be disassembled with ease for cleaning.

In some embodiments the model 200 can be formed such that some portions (e.g., the inner layer 210, the outer layer 220, the additional layer 230, etc.,) can be configured to be used once and disposed after use while some other portions can be configured to be for repeated use (e.g., support structures 260 that form ridges, struts etc.,). The portions configured to be re-used can be formed with durable materials while the single-use portions can be fabricated in a cost effective manner in bulk quantities using standard procedures designed for disposable equipment.

In some implementations, the model 200 can be used in training and/or testing the administration of clinical procedures such that the training achieved using a re-useable model 200 is transferrable to a use of a disposable single-use model 200.

Figure 7:
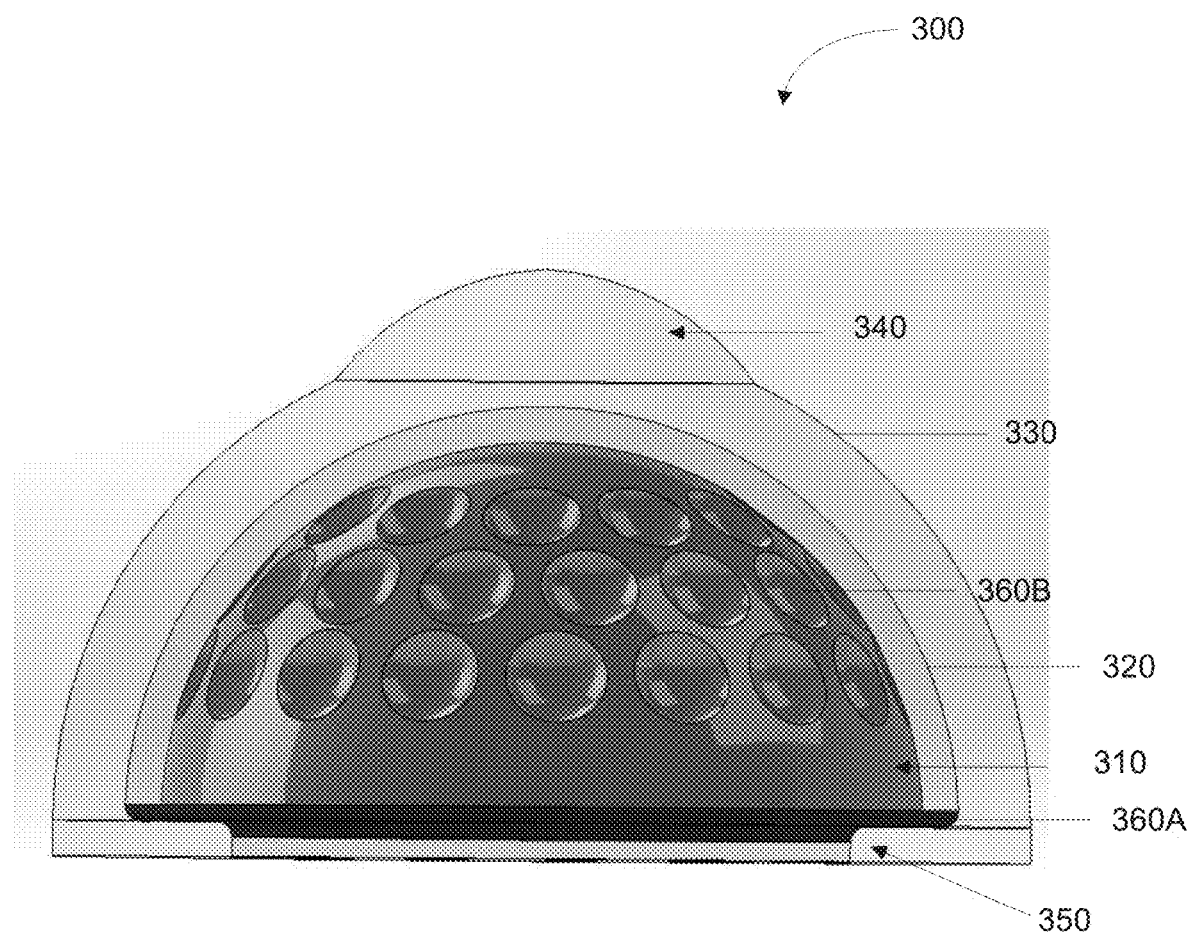
FIG. 7 is an illustration of a side view of a 3D multi-compartmental model of an eye, according to an embodiment.

FIG. 7 is an illustration of a side view of a model 300, according to an embodiment. The model 300 can be the same as or similar in structure and/or function to the models 100 and/or 200 described above. Thus, portions of the model 300 are not described in further detail herein. The model 300 includes an inner layer 310, an outer layer 330, and a base portion 350. The model 300 also includes an intermediate layer 320 and a dome portion 340. As shown in FIG. 7, the model 300 includes support structures that include a bottom lip 360A included at the base or bottom of the inner layer 310 and support structures in the form of hemi-spherical indentations 360B formed over the exterior surface of the inner layer 310. The bottom lip 360A is configured to maintain the gap defined between the inner layer 310 and the intermediate layer 320 and/or the outer layer 330. The indentations 360 B are configured to support the inner layer 310, the intermediate layer 320 and the outer layer 330, and prevent collapsing of the layers. In some embodiments, the model 300 can be configured to be a single-use device to be disposed after use. In some implementations, the model 300 can be configured to be fabricated in large batches with cost effective materials with low assembly requirements such that it can be a single-use device to be disposed after use. In some implementations, as described with reference to the models 100 and/or 200, the model 300 can be fabricated using relatively durable materials (e.g., re-useable plastic, re-useable rubber, silicone, re-useable polymers, and/or the like) that can withstand being washed (e.g., washed using detergents), cleaned, and/or treated in any suitable manner (e.g., autoclaved, sanitized, and/or the like) after each use or after a pre-determined set of uses. In some implementations, the model 300, similar to the models 100 and/or 200 described previously, can be fabricated in parts and be assembled together to form a functional model 300. In some instances, the model 300 can be disassembled after use to be suitably washed or treated before re-assembly for use. In some implementations, some portions of the model 300 (e.g., the inner layer 310, the outer layer 320, the additional layer 330, etc.,) can be disposable after a single use while some other portions can be configured to be for single-use (e.g., support structures 360 that form ridges, struts etc.,). The portions configured to be re-used can be formed with durable materials while the single-use portions can be fabricated in a cost-effective manner in bulk quantities using standard procedures designed for disposable equipment.

Figure 8:
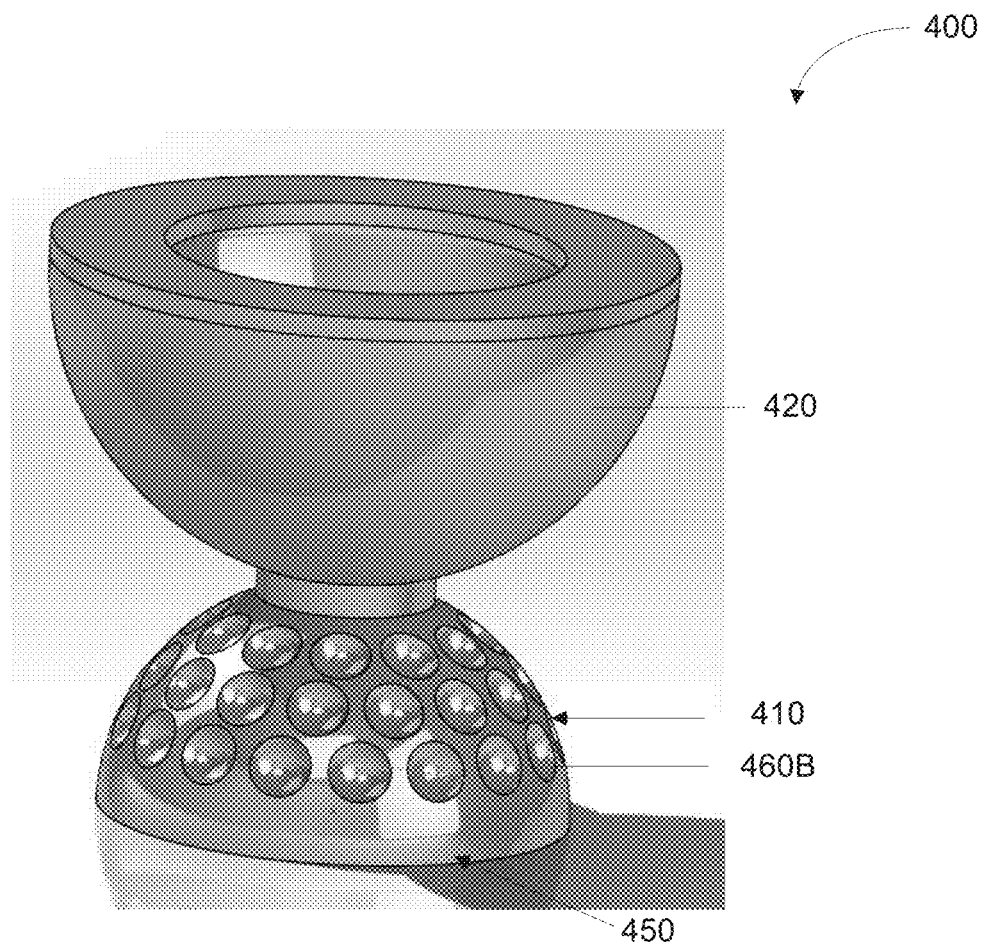
FIG. 8 is an illustration in a perspective view of a 3D multi-compartmental model of an eye, according to an embodiment.

FIG. 8 is an illustration of a perspective side view of a model 800, after fabrication but before use, according to an embodiment. The model 400 can be the same as or similar in structure and/or function to the models 100, 200, and/or 300 described above. Thus, portions of the model 400 are not described in further detail herein. The model 400 includes an inner layer 410, an outer layer 420, and a base portion 450. The model 400 also includes support structures in the form of hemi-spherical indentations 460B formed over the exterior surface of the inner layer 410. The model 400 can be fabricated monolithically or integrally as a single piece such that the inner layer 410 and the outer layer 430 are contiguously formed (e.g., in the shape of a hyperboloid or an hour-glass) as shown in FIG. 4. Such a monolithically manufacturing procedure can permit production of large quantities of models over a short period of time in a relatively cost-effective manner. In some instances, one or more portions of the model 400 may be desired to be fabricated with physical properties that are desirable during use but incompatible for manufacturing in the final form. For example, in some instances, the outer layer 420 and the inner layer 410 of the model 400 can be fabricated such that the gap defined between the outer layer 420 and the inner layer 410 can be precise and minimal. In some instances, the model 400 can be incompatible to be manufactured in the final form such that the at least partially hemispherical outer layer 420 is disposed over the at least partially hemispherical inner layer 410 because such a manufacturing may run the risk of the outer layer 420 collapsing over the inner layer 410 or otherwise disrupting the gap defined between the outer layer 420 and the inner layer 410. To avoid such a disruption the model 400 can be fabricated in an intermediate form, as shown in FIG. 8 in which the outer layer 420 and the inner layer 410 are fabricated as contiguous portions disposed opposite each other as two diametrically opposing at least partially hemispherical halves. In some instances, the model 400 can be packaged in the intermediate form (e.g., under sterile conditions).

Prior to use, the outer layer 430 can be inverted or flipped over by a user to be disposed over the inner layer 410 with the base portion 450 supporting the inner layer 410 and the outer layer 430, and ready to use. The outer layer 420 and the inner layer 410 can be formed with suitable materials such that the model 400 is flexible to perform the inverting procedure but has the desired stiffness to retain a shape of the final form upon inverting. In some implementations, the outer layer 420 and/or the inner layer 410 can include suitable adaptations such that the inverting procedure can be accomplished in a simple and straightforward manner and can accurately transition the model 400 from the intermediate form to the final form for use without damaging the model 400 or otherwise impacting it's use. The model 400 can include one or more adaptations (not shown) to aid in the inverting procedure. For example, the model 400 can include one or more markings, tabs, indents, grooves, and/or the like that can aid a user in implementing the inverting procedure. The indentations 460B are configured to support the inner layer 410 and the outer layer 430 and prevent collapsing of the outer layer 430 over the inner layer 410 during use.

In some embodiments, the model 400 can be configured to be a single-use device to be modified prior to use with a simple inverting action and to be disposed after use. In some implementations, the model 300 can be configured to be fabricated in large batches with cost effective materials with low assembly requirements such that it can be a single-use device to be disposed after use. In some implementations, as described with reference to the models 100, 200, and/or 300, the model 400 can be fabricated using relatively durable materials (e.g., re-useable plastic, re-useable rubber, silicone, re-useable polymers, and/or the like) that can withstand being washed (e.g., washed using detergents), cleaned, and/or treated in any suitable manner (e.g., autoclaved, sanitized, and/or the like) after each use or after a pre-determined set of uses. In some implementations, some portions of the model 400 (e.g., the portion forming the inner layer 410, the outer layer 420) can be disposable after a single use while some other portions can be configured to be reused (e.g., support structures, not shown in FIG. 8, that form ridges, struts etc.,). The portions configured to be re-used can be formed with durable materials and can be assembled over the model 400 prior to use, before or after the inverting procedure, while the single-use portions can be fabricated in a cost-effective manner in bulk quantities using standard procedures designed for disposable equipment.

Figure 9A:
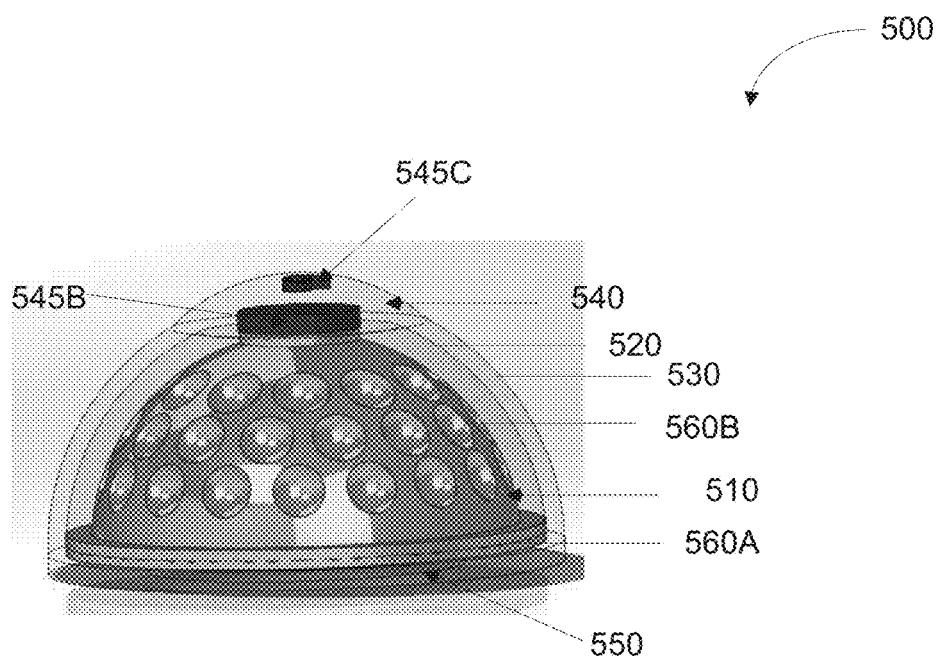
FIG. 9A illustrates in a side view a 3D multi-compartmental model of an eye.
Figure 9B:
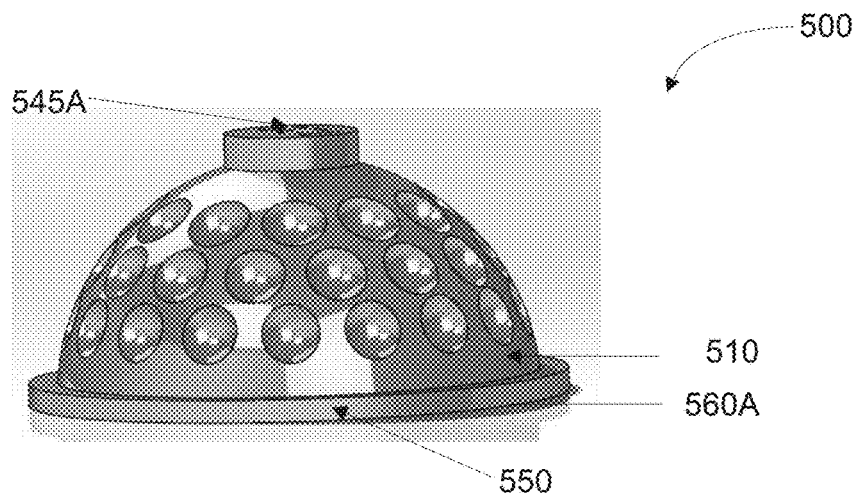
FIG. 9B illustrates in a side view an inner portion of the model of the eye shown in FIG. 9A, according to an embodiment.

FIG. 9A is an illustration of a side view of a model 500 according to an embodiment. FIG. 9B is an illustration of a side view of the inner layer 510. The model 500 can be the same as or similar in structure and/or function to the models 100, 200, 300, and/or 400 described above. Thus, portions of the model 500 are not described in further detail herein. The model 500 includes an inner layer 510, an outer layer 520, and a base portion 550. The model 500 also includes an additional layer 530 disposed over the outer layer 520 and a dome portion 540 disposed at the apex of the additional layer 430. The model 500 further includes a set of support structures including a bottom lip 560A disposed at the base or bottom of the inner layer 510 and support structures in the form of hemi-spherical concave indentations 560B formed over the exterior surface of the inner layer 510. The bottom lip 560A is configured to maintain the gap defined between the inner layer 510 and the intermediate layer 520 and/or the outer layer 530. some instances, during use of the model 100, the outer layer 120 may be prone to collapsing over the inner layer 110 when an injectate is being injected into the gap between the inner layer 110 and outer layer 120, for example, due to surface tension imparted by the injectate. The indentations 560 B are configured to support the inner layer 510, the outer layer 520 and the additional layer 530. The indentations 560 B are also configured to prevent collapsing of the outer layer 520 over the inner layer 510, for example, during use when an injectate is injected between the outer layer 520 and the inner layer 510.

In some implementations, the indentations 560B can be of suitable shape and size depending on the gap desired between the inner layer 510 and the outer layer 520. In some implementations, the model 500 can include various regions of one or more portions (e.g., the inner layer 510, the outer layer 520, the gap defined between the inner layer 510 and the outer layer 520) that can be selectively and/or independently modified to have different thickness, stiffness, orientation, shape, size, and/or the like to mimic natural variations found in the anatomy of the eye among patients. For example, in some embodiments, the model 500 can include demarcated regions (e.g., quadrants) such that each region is configured to mimic SCS of an eye sampled from a specific target population (e.g., an age of a patient population, a specific pathophysiology, etc.,) with the number, shape and/or size of indentations 560B in that region being defined to match the desired SCS.

In some implementations, the model 500 can be configured to be fabricated in large batches with cost effective materials with low assembly requirements such that it can be a single-use device to be disposed after use. In some implementations, as described with reference to the model 100, 200, 300, and/or 400, the model 500 can be fabricated using relatively durable materials (e.g., re-useable plastic, re-useable rubber, silicone, re-useable polymers, and/or the like) that can withstand being washed (e.g., washed using detergents), cleaned, and/or treated in any suitable manner (e.g., autoclaved, sanitized, and/or the like) after each use or after a pre-determined set of uses. In some implementations, the model 500, similar to the models 100, 200, 300, and/or 400 described above, can be fabricated in parts and be assembled together to form the functional model 200. In some instances, the model 500 can be disassembled after use to be suitably washed or treated before re-assembly for use. In some implementations the model 500 can be formed such that some portions (e.g., the inner layer 510, the outer layer 520, the additional layer 530, etc.,) can be configured to be used once and disposed after use while some other portions can be configured to be for repeated use (e.g., support structures 560A that form keying fixtures etc.,). The portions configured to be re-used can be formed with durable materials while the single-use portions can be fabricated in a cost-effective manner in bulk quantities using standard procedures designed for disposable equipment.

The model 500 can be fabricated such that the inner layer 510 and the outer layer 530 are formed separately and configured to be detachably connectable. The inner layer 510, the outer layer 520 and the additional layer 530 can be assembled and/or coupled together to form the model 500. To this end, as shown, in this embodiment, the inner layer 510 and the outer layer 530 include features to aid in alignment and/or coupling of the inner layer 510 with the outer layer 520 and with the additional layer 530.

As shown in FIGS. 9A and 9B, the model 500 also includes a set of keying features 545A 545B, and 545C included in the inner layer 510, the outer layer 520, and the additional layer 530, respectively. As shown in FIGS. 9A and 9B, the center of the exterior surface of the inner layer 510 includes a keying feature 545A disposed at the apex of the at least partially hemispherical inner layer 510. The center of the exterior surface of the outer layer 520 includes a keying feature 545B placed at the apex of the at least partially hemispherical outer layer 520. The center of the additional layer 530 defines the dome portion 540, and at the center of the dome portion 540 is defined the keying feature 545C. The keying features 545A and 545B can be used to align the outer layer 520 with the inner layer 510 during assembly of the model 500. In some implementations, the keying feature 545A on the exterior surface of the inner layer 510, the keying feature 545B on the exterior surface of the outer layer 520, and the keying feature 545C on the exterior surface of the additional layer 530, can be configured to physically align, or matingly couple or match in any suitable manner (e.g., match physically, match visually, etc.) such that upon fabrication they can be used to align and/or center the additional layer 530 with the outer layer 520 and align and/or center outer layer 520 with the inner layer 510 during assembly of the model 500.

In some implementations, the outer layer 520 and the additional layer 530 can be configured to be at least partially translucent and to permit light such that markings on one or more components beneath each layer can be visible by plain sight (or optionally using visual aids). The outer layer 520 and the additional layer 530 can be manipulated with respect to the inner layer 510 using the keying feature 545A on the exterior surface of the inner layer 510, the keying feature 545B on the exterior surface of the outer layer 530, and the keying feature 545C on the interior surface of the additional layer 530 to visually align with each other. Although in this embodiment the inner layer 510, the outer layer 520 and the additional layer 530 are described to include a keying feature, in some embodiments, the outer layer 520 and/or the additional layer 530 can include a keying feature instead of the inner layer 510 which can be coupled together using a suitable engagement or interlocking mechanism that secures the relative position and/or orientation of the inner layer 510 with respect to the outer layer 520 and/or the additional layer 530.

Figure 10A:
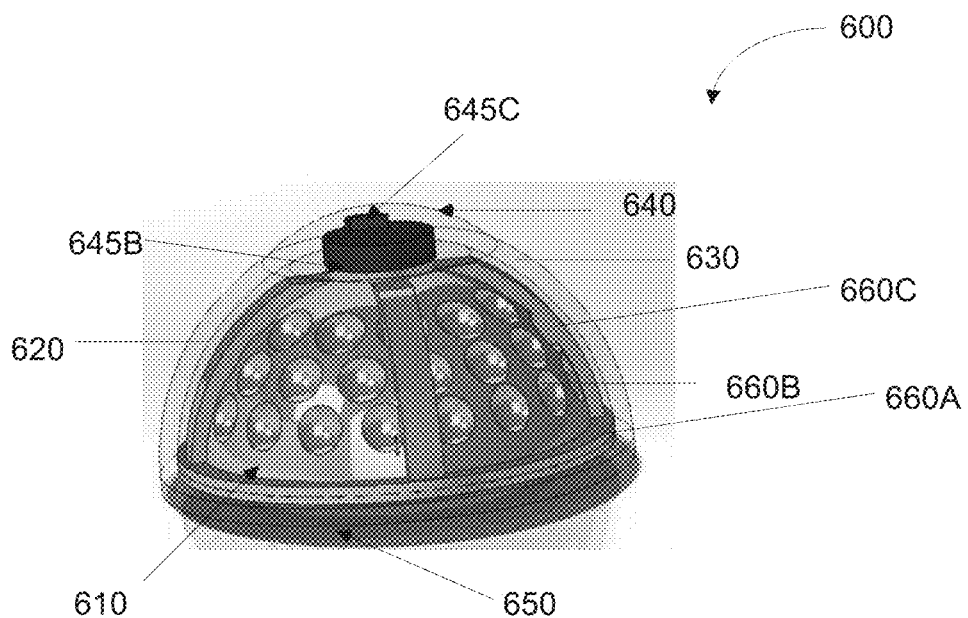
FIG. 10A illustrates in perspective view a 3D multi-compartmental model of an eye.
Figure 10B:
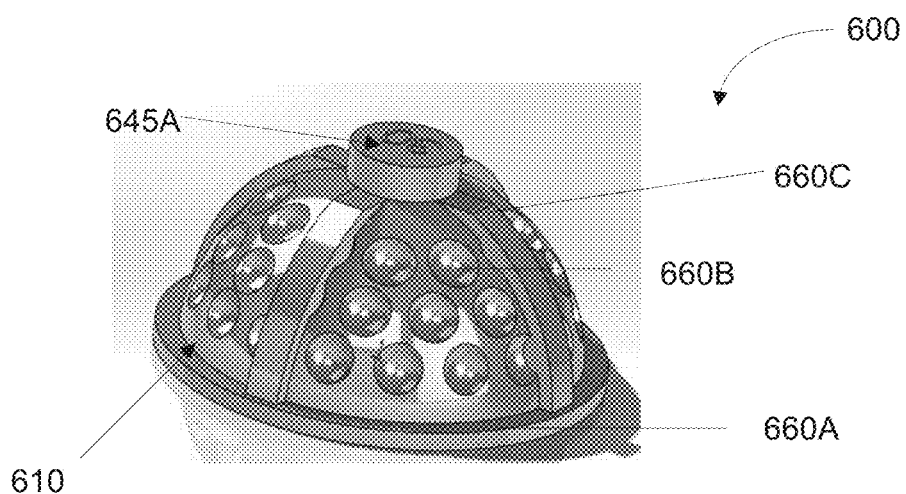
FIG. 10B illustrates in perspective view an inner portion of the model of the eye shown in FIG. 10A, according to an embodiment.

FIG. 10A is an illustration of a perspective side view of a model 600 according to an embodiment. FIG. 10B is an illustration of a perspective side view of the inner layer 610. The model 600 can be the same as or similar in structure and/or function to the models 100, 200, 300, 400, and/or 500 described above. Thus, portions of the model 600 are not described in further detail herein. The model 600 includes an at least partially hemispherical inner layer 610, an at least partially hemispherical outer layer 620 disposed over the inner layer 610, and a base portion 650. The model 600 also includes an additional layer 620 that can also be at least partially hemispherical and disposed over the outer layer 620. The model 600 includes a dome portion 640 disposed at the apex of the additional layer 630, and a set of support structures. The support structures include a bottom lip 660A disposed along the outer circumference of the base portion 650. The support structures include hemispherical concave indentations 660B defined over the exterior surface of the inner layer 610. The support structures also include four ridges 660C disposed on the exterior surface of the inner layer 610 at equally spaced distances from each other along the outer circumference of the inner layer 610. The bottom lip 660A is configured to maintain the gap defined between the inner layer 610 and the outer layer 620. The indentations 660 B are configured to support the inner layer 610, the outer layer 620, and prevent collapsing of the outer layer 620 over the inner layer 610 during use, for example, during injection of an injectate into the gap defined between the outer layer 620 and the inner layer 610 due to surface tension imparted by the injectate. The ridges 660C are configured to support the inner layer 610, the outer layer 620, and the additional layer 630 and to maintain the gap between the inner layer 610 and the outer layer 620. In some implementations, the ridges 660C can help prevent collapsing of the outer layer 620 over the inner layer 610, for example during fabrication, packaging, transport, handling, and/or use. Each ridge can be approximately 0.2-3 mm in thickness and can be formed using any suitable material to achieve any suitable stiffness and/or rigidity to provide the desired support for the inner layer 610 and/or the intermediate layer 620 during use and/or during storage.

Figure 11:
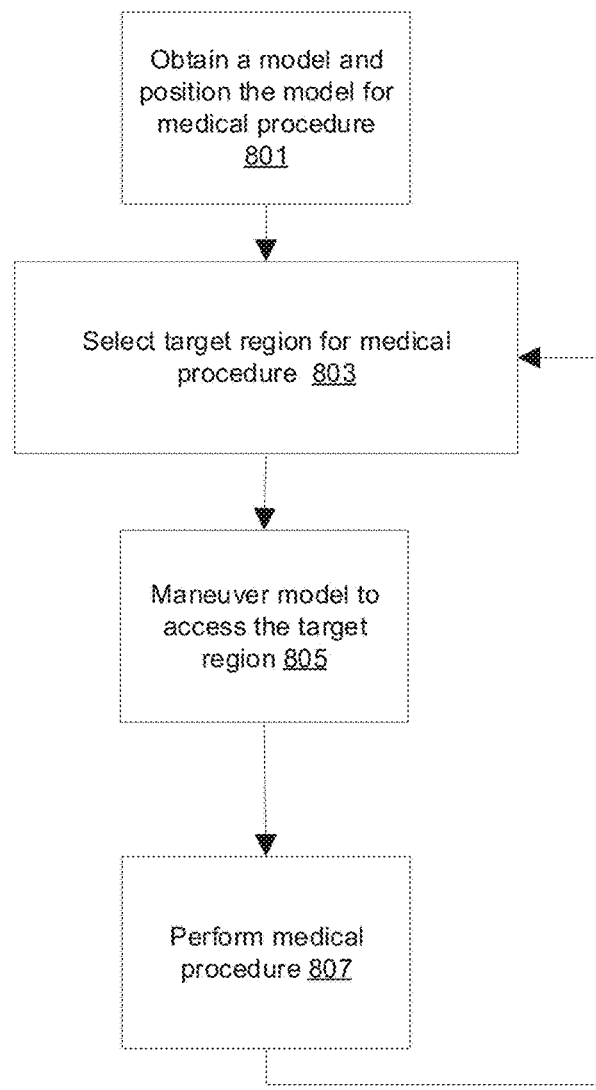
FIG. 11 is a flowchart describing a method of use of a 3D multi-compartmental model eye, according to an embodiment.

FIG. 11 is a flowchart illustrating an example method 800 of using a three-dimensional, multi-compartmental model (e.g., similar to or the same as the models described herein, including models 100, 200, 300, 400, 500, and/or 600). The method 800 includes, at 801, obtaining a model and positioning the model for a medical procedure. In some instances, the model may be positioned as a standalone or free-standing device (e.g., a hand-held, bench-top, table-top device and/or the like). In some instances, the model can be affixed to one or more fixtures or stands using suitable coupling devices such as clamps, pins, adhesives, and/or the like. The medical procedure can be any suitable training or educational procedure (e.g., intraocular injection).

At 803, the method 800 includes selecting a target region for performing the medical procedure. For example, in some instances, the model can be a model of a human eye and the procedure can be injection of an injectate into a gap mimicking the SCS of the eye. As another example, in some instances, the model can be a model of a human eye and the procedure can be injection of an injectate into a gap mimicking the SRS of the eye. The method can thus include selection of a suitable point of injection such that optimal amount of injectate can be introduced into the SCS or SRS while minimizing invasive access to any other undesirable structure of the eye, and/or while minimizing pain/discomfort.

As the suprachoroidal space can be a very small region, extensive training may be required to perfect the procedure of injecting into the suprachoroidal space without affecting the surrounding regions of the eye. Furthermore, a suitable target region may be selected based on the location known to provide easy access to the suprachoroidal space given other parameters of the medical procedure such as an access angle of injection, intervening structures (e.g., outer layers), etc. In some instances, the model used can include regions defined to mimic anatomical portions of the eye observed in a variety of patient populations. Said in another way, the model can include regions with varying mechanical or physical properties corresponding to tissue structures found across a target patient population, that can be taken advantage of to train personnel to successfully perform the medical procedure over a variety of patients. For example, the model can include regions defined to have outer layer of varying thickness. In some such models the regions with varying thickness can be demarcated to indicate the thickness.

In use, a specific region can be selected to practice performing the procedure on a particular group of target patient population. In some embodiments, regions with variation of properties can be indicated by landmarks (e.g., visual markings, tactile markings, etc.) for quick identification during training. In some implementations, the regions can have discreet and clear boundaries between two regions of varying properties (e.g., thickness). In some implementations, two adjacent regions of varying properties can have a gradual boundary with gradually varying properties (e.g., gradually changing thickness) from one region to another. In some embodiments the regions may have different thicknesses but be unmarked in which case the models may be used for testing purposes. The target region selection at 803, in these instances, can be regardless of the quadrant or region of the model but based on the region optimal for injection with respect to other surrounding structures (e.g., the limbus, etc.).

At 805, the method 800 incudes maneuvering the model to access the target region. The maneuvering can include suitably modifying the positioning and/or orientation of the model with respect to the angle of access for the procedure (e.g., angle of injection).

At 807 the method includes performing the medical procedure. In some instances, the performing the medical procedure can include injecting an injectate into a gap defined to mimic the subchoroidal/subretinal space in the model of the eye. In some instances, the medical procedure can include aspirating a substance that is present in a gap defined in a model of the eye the gap mimicking the SCS or SRS of the eye.

In some embodiments, the method includes inserting a distal end portion of a needle of a medical injector into a target region of the model of the eye to define a delivery passageway within the target region intended to mimic a target tissue or target space. In some instances, this can be followed by placing a distal end surface of a hub (e.g., a convex distal end surface of the hub) of the medical injector into contact with a target surface of the target regions mimicking a target tissue to fluidically isolate the delivery passageway. In some instances, the inserting is performed such that a centerline of the needle can be adjusted to be substantially normal to a target surface of the target region of the model eye and the procedure can be practiced. This is followed by placing a distal end surface of a hub of the medical injector into contact with a target surface of the target region of a model of the eye to fluidically isolate the delivery passageway. In some instances, whether the placement of the distal end surface of the hub is correct and in contact with the correct and/or desired target surface can be ascertained by gauging the resistance provided by the outermost surface of the model. For example, in embodiments that have no overt markings indicating target regions, the amount of resistance perceived by user during placement and/or insertion can be used to determine if the correct target region is selected. One or more insertions and/or placements can be repeatedly performed as a form of training to practice perceiving the appropriate resistance at contact, a loss of resistance upon insertion, and/or a change in back pressure imparted by the regions of the model of the eye during insertion and/or injection by the needle.

Next, the method includes conveying, after the placing, an injectate or substance into the target tissue via the needle. In some embodiments, the target tissue is an eye and the target surface are the conjunctiva of the eye or the target space is the subchoroidal or subretinal space. In some embodiments, the delivery passageway extends through an outer layer mimicking a sclera of the eye and the conveying includes conveying the substance into at least one of a gap representing the suprachoroidal space or lower portion of the sclera. In some embodiments, the delivery passageway extends through an outer layer mimicking the sclera of the eye and the conveying includes conveying the substance into at least one of a gap mimicking the subretinal space between the neural retinal layer and the retinal pigmented layer of the eye. In some embodiments, the method can further include adjusting, before the conveying, a length of the needle extending from the distal end surface of the hub. In some embodiments, the delivery is performed such that a centerline of the delivery passageway and a surface line tangent to the target surface defines an angle of entry of between about 75 degrees and about 105 degrees.

In some instances, the performing the medical procedure can include observing the effects and/or receiving feedback related to the effects of the procedure during the delivery of the procedure. The method includes observing a spread of the injectate or substance in the target tissue or space. In some instances, the delivery and/or the observing the spread of can be moderated in real-time using additional feedback such as loss of resistance and/or change in back pressure perceived by a user. For example, the performing the procedure can include observing, during injection, a gradual spread of injectate in the gap between an inner layer and an outer layer of the model or a gap between an inner layer and an inter mediate layer of a model, the gap mimicking the suprachoroidal space of an eye. The spread of injectate can be used to ascertain in the correct target region was selected and the correct depth of injection was selected. In some instances, the feedback (e.g., the lack of appropriate spread of injectate) can be used to terminate the procedure and retract the needle. In some instances, the feedback (e.g., the lack of appropriate spread of injectate) can be used to update one or more parameters of the procedure (e.g., an amount of pressure applied to eject the injectate, an angle associated with the needle, etc.). One or more injections of delivery can be repeatedly performed as a form of training to practice perceiving the appropriate loss of resistance and/or change in backpressure imparted by the regions of the model of the eye that are traversed by the needle and the target region at which injection is desired.

As used herein, the singular forms "a," "an", and "the" include plural referents unless the context clearly dictates otherwise. Thus, for example, the term "a member" is intended to mean a single member or a combination of members, "a material" is intended to mean one or more materials, or a combination thereof.

As used herein, the words "proximal" and "distal" refer to the direction closer to and away from, respectively, an operator (e.g., surgeon, physician, nurse, technician, etc.) who would insert the medical device into the patient, with the tip-end (i.e., distal end) of the device inserted inside a patient's body first. Thus, for example, the end of a microneedle described herein first inserted inside the patient's body would be the distal end, while the opposite end of the microneedle (e.g., the end of the medical device being manipulated by the operator) would be the proximal end of the microneedle.

As used herein, a "set" can refer to multiple features or a singular feature with multiple parts. For example, when referring to set of walls, the set of walls can be considered as one wall with distinct portions, or the set of walls can be considered as multiple walls.

As used herein, the terms "about" and "approximately" generally mean plus or minus 10% of the value stated. For example, about 0.5 would include 0.45 and 0.55, about 10 would include 9 to 11, about 1000 would include 900 to 1100.

As used herein, the terms "delivery member", "puncture member", and "puncturing member" are used interchangeably to refer to an article configured to pierce tissue layers and deliver a substance to a target tissue layer, for example, a needle or a microneedle.

As used herein, the terms "medicament container", and "medicament containment chamber" are used interchangeably to refer to an article configured to contain a volume of a substance, for example, a medicament.

The term "fluid-tight" is understood to encompass both a hermetic seal (i.e., a seal that is gas-impervious) as well as a seal that is liquid-impervious. The term "substantially" when used in connection with "fluid-tight," "gas-impervious," and/or "liquid-impervious" is intended to convey that, while total fluid imperviousness is desirable, some minimal leakage due to manufacturing tolerances, or other practical considerations (such as, for example, the pressure applied to the seal and/or within the fluid), can occur even in a "substantially fluid-tight" seal. Thus, a "substantially fluid-tight" seal includes a seal that prevents the passage of a fluid (including gases, liquids and/or slurries) therethrough when the seal is maintained at a constant position and at fluid pressures of less than about 5 psig, less than about 10 psig, less than about 20 psig, less than about 30 psig, less than about 50 psig, less than about 75 psig, less than about 100 psig and all values in between. Similarly, a "substantially liquid-tight" seal includes a seal that prevents the passage of a liquid (e.g., a liquid medicament) therethrough when the seal is maintained at a constant position and is exposed to liquid pressures of less than about 5 psig, less than about 10 psig, less than about 20 psig, less than about 30 psig, less than about 50 psig, less than about 75 psig, less than about 100 psig and all values in between.

Many embodiments described herein are directed particularly to the development of a surgical model of the anterior segment of the eye, to serve as a model for intraocular injections. Other applications using the same or similar principles may include but are not limited to: joint models for arthroplasty; cardio-vascular models for cardiac Surgery; spinal models for spinal Surgery; models for cranio-facial Surgery such as cleft palate; crash test dummy components; and ballistic impact models.

While the embodiments and methods herein describe delivering a medicament to a target region and/or aspirating a fluid from a target region, the embodiments described herein can be configured to facilitate training of personnel using a model for a biopsy procedure and/or removal of a substance from a target location.

While the embodiments have been described above in use for mimicking ocular tissue, in some instances, the embodiments and methods described herein can be used on any other suitable bodily tissue. For example, in some instances, the use of an adjustable length needle can be beneficial in conjunction with standard phlebotomy techniques during drug infusion and/or blood draw from a vein. Thus, while the embodiments and methods are specifically described above in use on ocular tissue, it should be understood that the embodiments and methods have been presented by way of example only, and not limitation.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

Although the systems and methods are shown and described herein as providing for delivery of medicaments in the suprachoroidal space and/or subretinal space, in other embodiments, the systems and the methods described herein can be applicable for delivery of any suitable therapeutic substance to any portion of the eye, such as, the cornea, the retinal area or the vitreous. In other embodiments, any of the systems, methods and devices described herein can be used to deliver any suitable therapeutic substance to any desired target tissue (including non-ocular tissue).

Where schematics and/or embodiments described above indicate certain components arranged in certain orientations or positions, the arrangement of components may be modified. Similarly, where methods and/or events described above indicate certain events and/or procedures occurring in certain order, the ordering of certain events and/or procedures may be modified. While the embodiments have been particularly shown and described, it will be understood that various changes in form and details may be made.

The invention claimed is:

1. A device to simulate an eye, comprising:
an inner layer including a base portion and having at least a partial hemispherical shape, an exterior surface of the inner layer defining a set of ridges and a set of hemispherical indentations between the set of ridges; and
an outer layer disposed over the inner layer, the outer layer having at least a partial hemispherical shape, the outer layer and the inner layer (1) collectively defining a gap between the inner layer and the outer layer, the gap configured to receive a fluid injectate that is injected using an injector, or (2) collectively configured to possess a potential space such that the gap is formed between the inner layer and the outer layer in response to the fluid injectate being injected by the injector between the inner layer and the outer layer;
the set of ridges being disposed between the inner layer and outer layer, and collectively with the set of hemispherical indentations being configured to prevent a collapse of the outer layer over the inner layer in response to receiving the fluid injectate.

2. The device of claim 1, further comprising:
an additional layer having an at least partial hemispherical shape, the additional layer disposed over and concentric with the inner layer; and
a dome portion disposed over an apex of the additional layer.

3. The device of claim 1, wherein:
the outer layer defines a plurality of regions, each region from the plurality of regions having at least one property from a set of properties that is different from the remaining regions from the plurality of regions, the set of properties including thickness, stiffness, hardness, surface markings, orientation, shape, color, or size.

4. The device of claim 3, wherein the plurality of regions include overt markings or colors indicating an identity associated with each region from the plurality of regions.

5. The device of claim 3, wherein the outer layer defining the plurality of regions is devoid of overt markings indicating an identity associated with each region from the plurality of regions.

6. The device of claim 1, wherein an inner radius of the outer layer is between about 10 mm and about 15 mm.

7. The device of claim 1, wherein a hardness of at least one of the inner layer or the outer layer is between about 20 to about 75 on a Durometer Shore A Scale.

8. The device of claim 1, wherein a thickness of the outer layer is between 0.5 mm and about 3 mm.

9. The device of claim 1, further comprising:
an additional layer having an at least partial hemispherical shape and having a dome portion disposed over an apex of the additional layer, the additional layer disposed over and concentric with the outer layer;
a first keying feature included on an exterior surface of the outer layer; and
a second keying feature included on an interior surface of the additional layer, the second keying feature configured to be aligned with the first keying feature, by rotating the outer layer relative to the additional layer and about a central axis common to the additional layer and the outer layer, to assemble the device.

10. A device to simulate an eye, comprising:
a first layer having at least a partial hemispherical shape and including a base portion; and
a second layer having at least a partial hemispherical shape, the second layer disposed over the first layer, the second layer and the first layer collectively defining a gap between the first layer and the second layer, the gap configured to receive an injectate that is injected using an injector,
an exterior surface of the first layer including a set of ridges that are configured to extend from the base portion towards an apex of the first layer, the exterior surface of the first layer defining a set of hemi-spherical indentations configured to prevent the second layer from collapsing over the first layer in response to receiving the injectate,
the second layer defining a first region and a second region, the first region having a first property and the second region have a second property different from the first property, the first property and the second property being representative of a thickness, stiffness, hardness, or surface marking associated therewith.

11. The device of claim 10, wherein the set of ridges have a thickness of about 0.2 mm to about 0.3 mm along at least one of a circumferential direction along a circumference of the first layer, or along a radial direction along a radius associated with the first layer.

12. The device of claim 10, wherein the base portion of the first layer includes a protruding lip along a circumference of the base portion, the protruding lip configured to maintain the gap between the first layer and the second layer.

13. The device of claim 10, further comprising:
a third layer having at least a partial hemispherical shape, the third layer disposed over and concentric with the second layer and including a dome portion that is hemispherical and disposed over an apex of the third layer.

14. The device of claim 13, wherein the dome portion included in the third layer is configured to be at least partially translucent such that at least an apex portion of an exterior surface of the second layer is at least partially visible through the dome portion, the device further comprising:
- a first keying feature included on the apex portion of the exterior surface of the second layer; and
- a second keying feature included on the dome portion included in the third layer, the first keying feature and the second keying feature being configured to be aligned by rotating the third layer relative to the second layer and about a central axis common to the second layer and the third layer to assemble the device.

15. The device of claim 10, wherein the injectate includes at least one of a fluid, gel, semisolid, or pellet.

16. A device to simulate an eye, comprising:
- an inner layer including a base portion and having at least a partial hemispherical shape, an exterior surface of the inner layer defining a set of ridges;
- an outer layer disposed over the inner layer, the outer layer having at least a partial hemispherical shape, the outer layer and the inner layer (1) collectively defining a gap between the inner layer and the outer layer, the gap configured to receive a fluid injectate that is injected using an injector, or (2) collectively configured to possess a potential space such that the gap is formed between the inner layer and the outer layer in response to the fluid injectate being injected by the injector between the inner layer and the outer layer,
- the set of ridges being disposed between the inner layer and outer layer, and configured to prevent a collapse of the outer layer over the inner layer in response to receiving the fluid injectate;
- an additional layer having an at least partial hemispherical shape and having a dome portion disposed over an apex of the additional layer, the additional layer disposed over and concentric with the outer layer;
- a first keying feature included on an exterior surface of the outer layer; and
- a second keying feature included on an interior surface of the additional layer, the second keying feature configured to be aligned with the first keying feature, by rotating the outer layer relative to the additional layer and about a central axis common to the additional layer and the outer layer, to assemble the device.

17. The device of claim 16, wherein:
the outer layer defines a plurality of regions, each region from the plurality of regions having at least one property from a set of properties that is different from the remaining regions from the plurality of regions, the set of properties including thickness, stiffness, hardness, surface markings, orientation, shape, color, or size.

18. The device of claim 17, wherein the at least one property includes stiffness.

19. The device of claim 17, wherein the plurality of regions include overt markings or colors indicating an identity associated with each region from the plurality of regions.

20. The device of claim 17, wherein the outer layer defining the plurality of regions is devoid of overt markings indicating an identity associated with each region from the plurality of regions.

21. The device of claim 16, wherein an inner radius of the outer layer is between about 10 mm and about 15 mm.

22. The device of claim 16, wherein a hardness of at least one of the inner layer or the outer layer is between about 20 to about 75 on a Durometer Shore A Scale.

23. The device of claim 16, wherein a thickness of the outer layer is between about 0.5 mm and about 3 mm.

24. A device to simulate an eye, comprising:
- a first layer having at least a partial hemispherical shape and including a base portion;
- a second layer having at least a partial hemispherical shape, the second layer disposed over the first layer, the second layer and the first layer collectively defining a gap between the first layer and the second layer, the gap configured to receive an injectate that is injected using an injector,
- an exterior surface of the first layer including a set of ridges that are configured to extend from the base portion towards an apex of the first layer,
- the second layer defining a first region and a second region, the first region having a first property and the second region have a second property different from the first property, the first property and the second property being representative of a thickness, stiffness, hardness, or surface marking associated therewith; and
- a third layer having at least a partial hemispherical shape, the third layer disposed over and concentric with the second layer and including a dome portion that is hemispherical and disposed over an apex of the third layer,
- wherein the dome portion included in the third layer is configured to be at least partially translucent such that at least an apex portion of an exterior surface of the second layer is at least partially visible through the dome portion,
- a first keying feature included on the apex portion of the exterior surface of the second layer, a second keying feature included on the dome portion included in the third layer, the first keying feature and the second keying feature being configured to be aligned by rotating the third layer relative to the second layer and about a central axis common to the second layer and the third layer to assemble the device.

25. The device of claim 24, wherein:
the second layer defines a plurality of regions, each region from the plurality of regions having at least one property from a set of properties that is different from the remaining regions from the plurality of regions, the set of properties including thickness, stiffness, hardness, surface markings, orientation, shape, color, or size.

26. The device of claim 25, wherein the at least one property includes stiffness.

27. The device of claim 25, wherein the plurality of regions include overt markings or colors indicating an identity associated with each region from the plurality of regions.

28. The device of claim 25, wherein the second layer defining the plurality of regions is devoid of overt markings indicating an identity associated with each region from the plurality of regions.

29. The device of claim 24, wherein an inner radius of the second layer is between about 10 mm and about 15 mm.

30. The device of claim 24, wherein a hardness of at least one of the first layer or the second layer is between about 20 to about 75 on a Durometer Shore A Scale.

31. The device of claim 24, wherein a thickness of the second layer is between about 0.5 mm and about 3 mm.

* * * * *